US009854055B2

(12) United States Patent
Sainio et al.

(10) Patent No.: US 9,854,055 B2
(45) Date of Patent: Dec. 26, 2017

(54) METHOD AND APPARATUS FOR PROVIDING PROXY-BASED CONTENT DISCOVERY AND DELIVERY

(75) Inventors: Miikka Johannes Sainio, Kerava (FI); Atte Lahtiranta, Bedford, MA (US)

(73) Assignee: Nokia Technologies Oy, Espoo (FI)

( * ) Notice: Subject to any disclaimer, the term of this patent is extended or adjusted under 35 U.S.C. 154(b) by 372 days.

(21) Appl. No.: 13/073,678

(22) Filed: Mar. 28, 2011

(65) Prior Publication Data

US 2012/0221697 A1 Aug. 30, 2012

Related U.S. Application Data

(60) Provisional application No. 61/447,199, filed on Feb. 28, 2011.

(51) Int. Cl.
G06F 15/173 (2006.01)
H04L 29/08 (2006.01)

(52) U.S. Cl.
CPC ......... H04L 67/2847 (2013.01); H04L 67/02 (2013.01); H04L 67/22 (2013.01); H04L 67/26 (2013.01); H04L 29/08729 (2013.01)

(58) Field of Classification Search
USPC ....................................................... 709/223
See application file for complete search history.

(56) References Cited

U.S. PATENT DOCUMENTS

| 6,065,055 | A | * | 5/2000 | Hughes | G06F 17/30867 |
| | | | | | 707/E17.109 |
| 6,085,193 | A | * | 7/2000 | Malkin | G06F 17/30902 |
| 6,389,422 | B1 | * | 5/2002 | Doi | G06F 17/30132 |
| | | | | | 707/758 |
| 6,415,368 | B1 | * | 7/2002 | Glance | G06F 17/30902 |
| | | | | | 707/E17.12 |
| 6,772,203 | B1 | * | 8/2004 | Feiertag | G06F 17/30899 |
| | | | | | 707/E17.119 |
| 6,782,423 | B1 | * | 8/2004 | Nakayama | G06F 17/30864 |
| | | | | | 706/59 |

(Continued)

FOREIGN PATENT DOCUMENTS

| EP | 1 139 232 A1 | 10/2001 |
| WO | 2010/060438 A1 | 6/2010 |

OTHER PUBLICATIONS

International Search Report for PCT/FI2012/050174 dated Jun. 27, 2012, pp. 1-6.

(Continued)

*Primary Examiner* — Viet Vu
*Assistant Examiner* — James Edwards
(74) *Attorney, Agent, or Firm* — Ditthavong & Steiner, P.C.

(57) ABSTRACT

An approach is provided for proxy-based content discovery and delivery. A proxy platform determines access information with respect to one or more web resources. The access information associated with a client of a proxy server. The proxy platform processes and/or facilitates a processing of the access information to determine a frequency of access of the one or more web resources via the proxy server. The proxy platform then determines to initiate a caching of at least a portion of the one or more web resources at the client based, at least in part, on the frequency of access.

17 Claims, 8 Drawing Sheets

(56) References Cited

U.S. PATENT DOCUMENTS

| | | | | |
|---|---|---|---|---|
| 7,047,287 B2* | 5/2006 | Sim | ............ | G06F 17/30194 707/E17.01 |
| 7,970,816 B2* | 6/2011 | Chess | ............ | G06F 17/30902 709/203 |
| 8,135,398 B2* | 3/2012 | Wang | ............ | G06Q 10/087 455/414.1 |
| 9,036,509 B1* | 5/2015 | Addepalli | ............ | H04W 4/046 370/259 |
| 2002/0032772 A1 | 3/2002 | Olstad et al. | | |
| 2003/0026241 A1* | 2/2003 | Ono | ............ | H04L 45/04 370/349 |
| 2003/0182401 A1* | 9/2003 | Moriya | ............ | H04L 49/90 709/219 |
| 2003/0187978 A1* | 10/2003 | Nakamura | ............ | H04L 12/2602 709/224 |
| 2004/0111492 A1* | 6/2004 | Nakahara | ............ | H04L 29/06 709/219 |
| 2004/0205208 A1* | 10/2004 | Koponen | ............ | H04L 29/06 709/230 |
| 2005/0132049 A1 | 6/2005 | Inoue et al. | | |
| 2005/0193096 A1* | 9/2005 | Yu | ............ | H04L 67/2847 709/219 |
| 2006/0168334 A1* | 7/2006 | Potti | ............ | H04L 67/1008 709/239 |
| 2006/0259690 A1* | 11/2006 | Vittal | ............ | G06F 17/30902 711/118 |
| 2007/0067271 A1* | 3/2007 | Lu | ............ | G06Q 10/10 |
| 2007/0122105 A1* | 5/2007 | Fukuda | ............ | G06F 17/3002 386/265 |
| 2007/0143484 A1* | 6/2007 | Drouet | ............ | H04L 12/1859 709/227 |
| 2007/0203906 A1* | 8/2007 | Cone | ............ | G06F 17/30867 |
| 2008/0134039 A1* | 6/2008 | Fischer | ............ | G06F 17/30053 715/733 |
| 2008/0195824 A1* | 8/2008 | Sadovsky | ............ | G06F 21/62 711/158 |
| 2009/0024439 A1* | 1/2009 | Ryan | ............ | G06Q 10/06312 705/7.19 |
| 2009/0222454 A1* | 9/2009 | Liesche | ............ | G06F 17/30873 |
| 2009/0265374 A1* | 10/2009 | Bang | ............ | G06Q 10/10 |
| 2010/0082622 A1* | 4/2010 | Irie | ............ | G06F 17/30038 707/736 |
| 2010/0094984 A1* | 4/2010 | Dingler | ............ | H04L 65/1016 709/223 |
| 2010/0124233 A1* | 5/2010 | Shi | ............ | H04L 45/00 370/401 |
| 2011/0041058 A1* | 2/2011 | Butler | ............ | G06F 21/552 715/709 |
| 2011/0093654 A1* | 4/2011 | Roberts | ............ | G06F 1/3203 711/105 |
| 2012/0110015 A1* | 5/2012 | Nath | ............ | G06F 17/30693 707/780 |
| 2012/0130976 A1* | 5/2012 | Cone | ............ | G06F 17/30867 707/706 |
| 2012/0167093 A1* | 6/2012 | Shook | ............ | G06F 12/0802 718/100 |
| 2012/0284356 A1* | 11/2012 | Luna | ............ | G06F 17/30902 709/213 |
| 2013/0282814 A1* | 10/2013 | Marcucci | ............ | G06Q 10/10 709/204 |

OTHER PUBLICATIONS

International Written Opinion for PCT/FI2012/050174 dated Jun. 27, 2012, pp. 1-8.

Yao, B. et al., "Proxy-based Recovery for Applications on Wireless Hand-held Devices", pp. 1-9, School of Electrical and Computer Engineering, Purdue University, 1060-9857/00, 2000 IEEE.

Extended European Search Report for corresponding European Application No. 12751834.8, dated Jul. 21, 2014, 8 pages.

* cited by examiner

METHOD AND APPARATUS FOR PROVIDING PROXY-BASED CONTENT DISCOVERY AND DELIVERY

RELATED APPLICATIONS

This application claims the benefit of the earlier filing date under 35 U.S.C. §119(e) of U.S. Provisional Application Ser. No. 61/447,199 filed Feb. 28, 2011, entitled "Method and Apparatus for Providing Proxy-Based Content Discovery and Delivery," the entirety of which is incorporated herein by reference.

BACKGROUND

Wireless (e.g., cellular) service providers and device manufacturers are continually challenged to deliver value and convenience to consumers by, for example, providing compelling network services, applications, and content. In light of an increasingly web-centric culture, one emerging service is the use of wireless devices to access mobile web services. However, limited resources (e.g., bandwidth, processing power, availability of the mobile web server) within the wireless environment can limit access to these web services on mobile devices. Accordingly, service providers and device manufacturers face significant technical challenges to overcome such limitations by enabling efficient and secure access to web services via, for instance, a proxy server.

SOME EXEMPLARY EMBODIMENTS

Therefore, there is a need for an approach for providing proxy-based content discovery and delivery.

According to one embodiment, a method comprises determining access information with respect to one or more web resources. The access information associated with a client of a proxy server. The method also comprises processing and/or facilitating a processing of the access information to determine a frequency of access of the one or more web resources via the proxy server. The method further comprises determining to initiate a caching of at least a portion of the one or more web resources at the client based, at least in part, on the frequency of access.

According to another embodiment, an apparatus comprises at least one processor, and at least one memory including computer program code, the at least one memory and the computer program code configured to, with the at least one processor, cause, at least in part, the apparatus to determine access information with respect to one or more web resources. The access information associated with a client of a proxy server. The apparatus is also caused to determine to process and/or facilitate a processing of the access information to determine a frequency of access of the one or more web resources via the proxy server. The apparatus is further caused to determine to initiate a caching of at least a portion of the one or more web resources at the client based, at least in part, on the frequency of access.

According to another embodiment, a computer-readable storage medium carries one or more sequences of one or more instructions which, when executed by one or more processors, cause, at least in part, an apparatus to determine access information with respect to one or more web resources. The access information associated with a client of a proxy server. The apparatus is also caused to determine to process and/or facilitate a processing of the access information to determine a frequency of access of the one or more web resources via the proxy server. The apparatus is further caused to determine to initiate a caching of at least a portion of the one or more web resources at the client based, at least in part, on the frequency of access.

According to another embodiment, an apparatus comprises means for determining access information with respect to one or more web resources. The access information associated with a client of a proxy server. The apparatus also comprises means for processing and/or facilitating a processing of the access information to determine a frequency of access of the one or more web resources via the proxy server. The apparatus further comprises means for determining to initiate a caching of at least a portion of the one or more web resources at the client based, at least in part, on the frequency of access.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of any of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF PREFERRED EMBODIMENT

A method and apparatus for providing proxy-based content discovery and delivery are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various embodiments are described with respect to providing proxy-based content discovery and delivery within a wireless network environment, it is contemplated that the various embodiments of the approach described herein may be used within any type of communication system or network and with any mode of communication available of the network (e.g., data communications, Internet communication, voice communication, text communication, etc). In addition, although the various embodiments are further described with respect to mobile devices, it is contemplated that the various embodiments are applicable to any type of device with network access (e.g., stationary terminals, personal computers, etc.).

Figure 1:
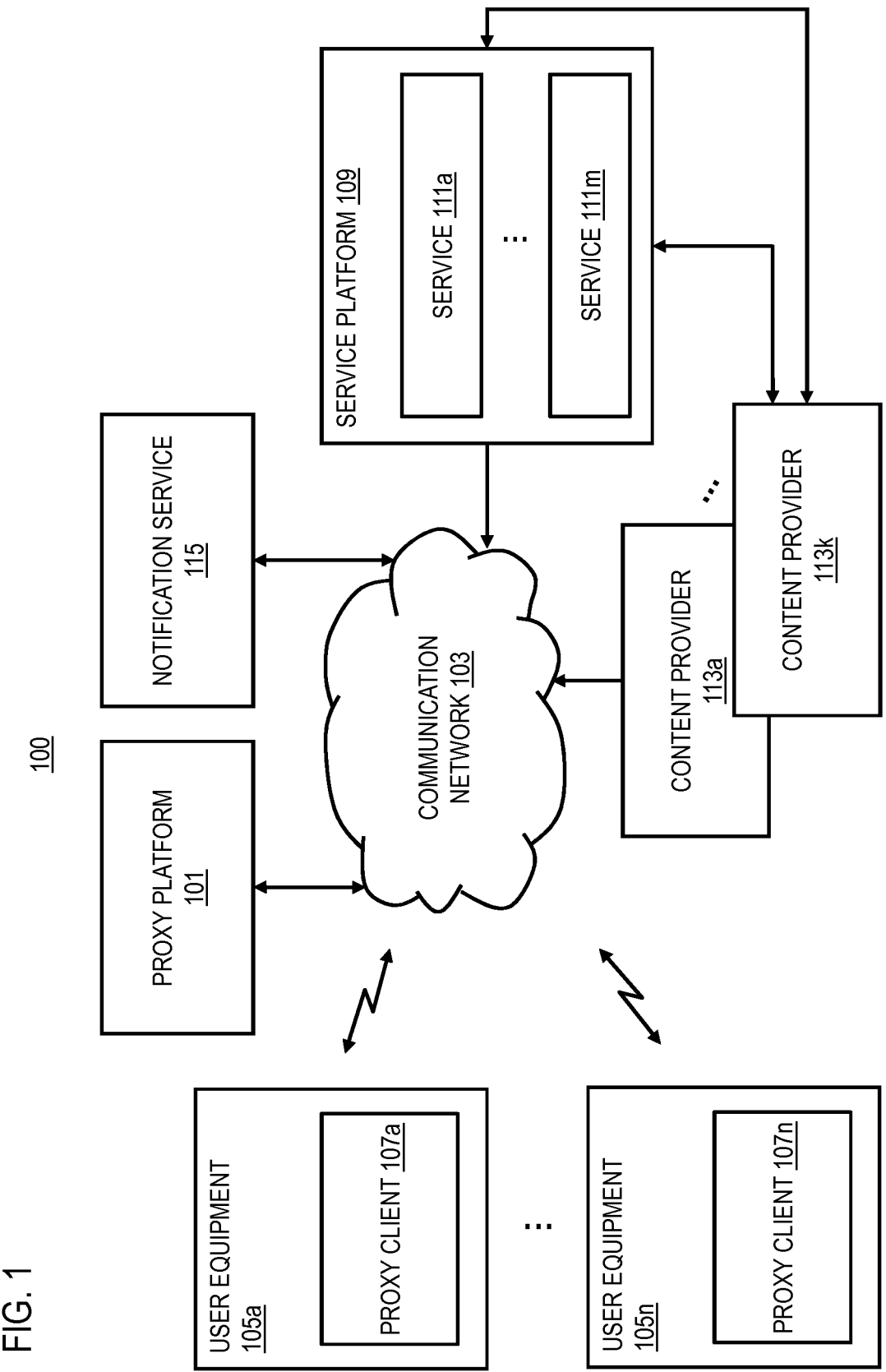
FIG. 1 is a diagram of a communication system capable of providing proxy-based content discovery and delivery, according to one embodiment.

FIG. 1 is a diagram of a communication system capable of providing proxy-based sharing of access histories, according to one embodiment. Many modern web-based services (e.g., maps, music, video, electronic books, etc.) can be quite data intensive and involve transfers of significant amounts of data between client device and the services. As a result loading or access times associated with the web services, applications, and related content can be significant, particularly in mobile wireless environments where bandwidth and device resources can be limited. By way of example, loading times includes, at least in part, a combination of: (1) a browser or client startup time on the device, (2) the time it takes for the browser or client to initiate a network connection, and (3) the time it takes to load the actual content. In each of the three areas, the relatively limited resources of mobile device operating within a wireless environment can result in extended load times which can discourage users from accessing such web services or content.

To address this problem, a system 100 of FIG. 1 introduces a capability for a proxy platform 101 (e.g., a proxy server) to monitor the access history of users (e.g., user equipment (UEs) 105a-105n, also collectively referred to as UEs 105) over a communication network 103 and then automatically send data associated with often-visited communication endpoints (e.g., websites, services, applications, etc.) for caching at the UEs 105a-105n. In one embodiment, this is achieved via respective proxy clients 107a-107n (e.g., browser applications, client applications, etc.) residing on the UEs 105. The proxy clients 107a-107n (also collectively referred to as proxy clients 107) operate in coordination with the proxy platform 101 which access web or network content on behalf of the proxy clients 107. In one embodiment, the proxy platform 101 receives requests from the proxy clients 107 to route communication traffic to requested communication endpoints and/or resources (e.g., websites, services, applications, etc. available over the communication network 103) of the proxy platform 101. In addition, the proxy platform 101 can route return communication traffic from the communication endpoints or resources to the any of the proxy clients 107 and/or UEs 105. In one embodiment, the access history of a proxy client 107 includes, at least in part, a record the requested communication endpoints and/or resources and the related communication traffic originating and/or terminating there from.

In one embodiment, the proxy platform 101 identifies an accessing proxy client 107 and tracks the network access information or history associated with the proxy client 107. For example, if a user of the proxy client 107 visits a certain website or communication endpoint daily, the proxy platform 101 records the access information or behavior with respect to the website, and provide for automatic transmission (e.g., push transmission) of at least part of the website content for caching and access at the proxy client 107. By way of example, the website or communication endpoint can include or be provided by a service platform 109, the services 111a-111m (also collectively referred to as services 111), the content providers 113a-113k (also collectively referred to as content providers 113), or any other component with connectivity to the communication network 103 (e.g., another UE 105). For example, the service platform 109, the service 111, and/or the content providers 113 may provide any number of services (e.g., mapping services, social networking services, media services, content services, etc.) via a web server or other means of communications (e.g., text messaging, voice, instant messaging, chat, etc.). In other words, the communication endpoints represent a terminating point of communications from the proxy clients 107, and an originating point of communications to the proxy clients 107. In this case, the access histories record interactions of the UEs 105 and their respective proxy clients 107 with the communication endpoints or resources available via the proxy platform 101 and/or the communication network 103.

In one embodiment, the transmission to initiate the caching can be configured to happen, for instance, in a timed fashion (e.g., according to predetermined schedule and/or frequency). In addition or alternatively, the proxy platform 101 can monitor the website of interest for changes and then push the updated content to the proxy client 107 for caching. In one embodiment, the notification can be generated by the proxy platform 101 directly to the proxy client 107, or the proxy platform 101 can direct a notification service 115 to send notification. By way of example, the notification service 115 can operate independently to facilitate unified delivery of notifications from a variety of services or processes to the UEs 105 and/or the proxy clients 107.

In another embodiment, the system 100 enables use of social features to enhance content discovery, delivery, and caching at the proxy clients 107. More specifically, the system 100 enables the proxy platform 101 to monitor access information and/or access histories associated with other users (e.g., friends, colleagues, family, etc.) to determine what to transmit to the proxy client 107 for caching. In other words, various embodiments of the approach described herein can be expanded so that if a number of a user's friends visit a specific site, the proxy platform 101 can push or transmit a notification to the user's proxy client 107 to indicate potential sites or content of interest. In one embodiment, the notification can include or be accompanied by at least part of the recommended content for caching at the user's proxy client 107. For example, under various embodiments of the social features described herein, the proxy platform 101 can determine what communication endpoints or websites are most often visited by a user's social network contacts, and then recommend the caching of those sites to the user. By making the content discovery and caching experience more socially engaging, the system 100 can result in an enhanced browsing experience that can promote greater user involvement and use of browsers and other clients for accessing data, information, communication, etc. functions of the system 100.

By caching the website or content at the user's proxy client 107, the system 100 reduces the potential loading times associated with establishing a network connection and load the content when the user requests access to the content. The reduction is achieved because content of interest to the user has already be pre-fetched and cached at the UE 105 before a specific request by the user to view the content.

In some embodiments, the user can provide feedback to the system 100 regarding whether the cached content anticipates the user's data needs. By way of example, the feedback may be provided explicitly (e.g., by direct input from the user rating the cached content). In addition or alternatively, the feedback may be provided implicitly based on whether the cached content was accessed by the user. The proxy platform 101 can use the feedback to improve its recommendations regarding what content or data to cache at the proxy client 107.

In yet another embodiment, the system 100 may schedule and/or push content for multiple communication endpoints or websites at one scheduled time. In this way, the proxy platform 101 can reduce the loading times and communication overhead associated with initiating independent data sessions to retrieve content. The proxy platform 101 can then push the content to the proxy client 107 for caching. In other embodiments, the system 100 may prioritize the communication endpoints and/or their data content based on historical information, user input, learning, and the like. Based, on the determined priority, the system 100 can then schedule the retrieval and caching of the corresponding content.

For example, the proxy platform 101 can schedule the caching of content based on network availability. In one embodiment, the network availability is based, at least in part, on respective bandwidth capacities, bandwidth limitations, etc. of the communication network 103, the UEs 105, the proxy platform 101, the service platform 109, the services 111, the content providers 113, and/or other components of the system 100. As used herein, the term bandwidth capacity refers to either a theoretical or measured capacity of the network. For example, the bandwidth capacity can refer to a speed of the network connection (e.g., 1 Mbps), a total cap or allotment of bandwidth (e.g., a maximum of 200 MB per month), and/or the like. In one embodiment, the bandwidth capacity is based on estimates and/or measurements of the bandwidth previously attained over the network. For example, the bandwidth capacity can be calculated as an average of previous bandwidth measurements made by one or more devices operating over the network.

In another embodiment, the devices can then share the measurements to estimate the bandwidth capacity. The term bandwidth limitations refer to, for instance, user-defined limits on how bandwidth capacity is to be used by the system 100 for implementing the approach described herein. For example, the user may limit the system 100 to 75% of the bandwidth capacity. In another example, the user may specify a dollar amount for the cost of the bandwidth or another measure of network condition (e.g., QoS, available duration, etc.) as limits. In one embodiment, on first joining a network, the system 100 can suggest one or more bandwidth limits and/or request the limits from the user. By way of example, the bandwidth limit may be suggested based on collaborative filtering of limits applied by other users.

In some embodiments, in addition to various embodiments of the process for content discovery and delivery described herein, the proxy platform 101 can perform any number of communications related functions for routing and/or processing communication traffic. For example, the proxy platform 101 may compress or otherwise modify content that is to be delivered to the proxy clients 107 based, at least in part, on one or more capabilities or characteristics of the receiving UE 105. For example, in wireless environments, the proxy platform 101 can compress data for more efficient transmission, transform content to reduce the amount of data for transfer, reformat content for display in smaller screens, etc.

In one embodiment, the proxy clients 107 include, at least in part, functions and/or controls for sharing access histories. By way of example, the functions include, at least in part: (1) defining access policies, access lists (e.g., blacklists, whitelists, gray lists, etc.); (2) monitoring access histories (e.g., communication records, web histories, etc.); (3) monitoring context information (e.g., location, activity, device resources available, device resources consumed, etc.); and the like.

In one embodiment, the proxy clients 107 and/or the proxy platform 101 can generate the access policies to apply to content discovery and delivery by using crowd-sourcing (e.g., common access policies gathered from other UEs 105 and/or their respective users). More specifically, the access policies can be applied to grant, deny, or restrict requests to cache content from particular communication endpoints. For example, by crowd-sourcing the access information, the system 100 can quickly respond to new security or privacy threats posed by potentially malicious or objectionable communication endpoints, and also reduce resource burdens (e.g., operational expense, computation resources, etc.)

associated with protecting the security and privacy of cached content operating under a completely managed system. In one embodiment, the access polices can be based, at least in part, on access information related to the proxy clients 107 and/or the communication endpoints/resources referenced in the access histories. As used herein, access information includes identification of one or more communication endpoints or proxy clients 107, the access behavior that has been or is to be associated with the communication endpoint or proxy clients 107, descriptions of the communication endpoints or proxy clients 107, characteristics of the communication endpoints or proxy clients 107, and/or any other information that can indicate potential risks associated with the sharing access histories involving one or more communication endpoints, resources, and/or proxy clients 107. For example, the access information may include flags indicating that a particular endpoint (e.g., website) or proxy client 107 is malicious, spreads malware, is infected with one or more viruses, is age-restricted, contains objectionable material, etc. In one embodiment, the proxy platform 101 and/or the owner proxy client 107 can then define access policies that prohibit or otherwise restrict caching content from communication endpoints involving such potentially malicious or objectionable content.

In one embodiment, the reported access information can be verified by access information received from other users. For example, the system 100 may only use access information that has been reported by multiple UEs 105 or users. In addition, the system 100 enables user to report on the accuracy of previously reported access information. For example, other users relying on the access information can give feedback or a rating of the information.

In addition or alternatively, identification of potentially malicious and/or objectionable materials may be provided by or obtained from third party providers (e.g., the services 111 and/or content providers 113) or preinstalled on the proxy platform 101. For example, an organization may maintain a blacklist of objectionable, malicious, fraudulent or otherwise risky communication endpoints, resources, and/or proxy clients 107.

By way of example, the UE 105 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 105 can support any type of interface to the user (such as "wearable" circuitry, etc.).

Additionally, the communication network 103 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

Communication is facilitated between the UE 105 and the proxy platform 101 via the communication network 103 using well known, new or still developing protocols. In this context, a protocol includes a set of rules defining how the network nodes within the communication network 103 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the proxy clients 107 and the proxy platform 101 interact according to a client-server model. It is noted that the client-server model of computer process interaction is widely known and used. According to the client-server model, a client process sends a message including a request to a server process, and the server process responds by providing a service. The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
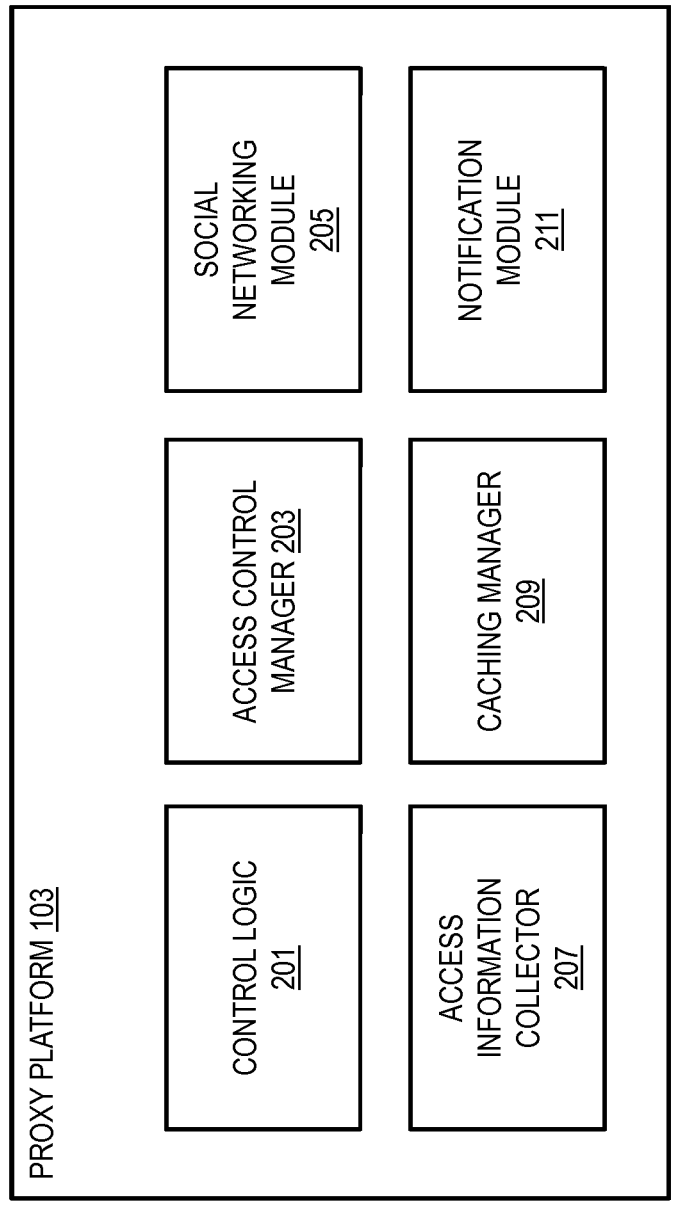
FIG. 2 is a diagram of components of a proxy platform, according to one embodiment.

FIG. 2 is a diagram of components of a proxy platform, according to one embodiment. By way of example, the proxy platform 101 includes one or more components for providing proxy-based content discovery and delivery. It is contemplated that the functions of these components may be combined in one or more components or performed by other components of equivalent functionality. In this embodiment, the proxy platform 101 includes a control logic 201, an access control manager 203, a social networking module 205, an access information collector 207, a caching manager 209, and a notification module 211.

More specifically, the control logic 201 executes at least one algorithm for performing one or more functions of the proxy platform 101. For example, the control logic 201 interacts with the access control manager 203 to identify proxy clients 107 that intend provide access information for initiating caching of content from communication endpoints via the proxy platform 101. In one embodiment, the proxy clients 107 identify themselves to the proxy platform 101 using, for instance, and text message sent to the proxy platform 101 to initiate social features of various embodiments of the content discovery and delivery process. The proxy platform 101 can then parse the text message to determine identifiers (e.g., phone numbers) associated with the respective clients 107 for identification. In addition or alternatively, the proxy clients 107 may identify using any means and/or unique identifiers (e.g., user name, user account, etc.).

In some embodiments, the text message or other identification means may contain authentication credentials to ensure that only authorized proxy clients 107 can participate in the social aspects of the various embodiments of the approach described herein. In addition, the authentication credentials 107 can also ensure that any proxy clients 107 that are designated to participate in content discovery, delivery, and/or caching has the authority and/or rights to share their respective access histories or access information. It is contemplated that any authentication credentials or authentication means can be used to ensure that only authorized proxy clients 107 are able to participate in the content discovery and delivery process discussed with respect to the various embodiments of the approach described herein.

In one embodiment, the access control manager 203 can interact with a social networking module 205 to determine candidate proxy clients 107 for sharing access information or access histories to facilitate content discovery and delivery. For example, the social networking module 205 can recommend one or more groups of proxy clients 107 based, at least in part, on social relationships (e.g., being in the same social networking group, being related in social graph, etc.) of the users of the respective proxy clients 107. A proxy client 107 wishing to share its access history can then select the participating proxy clients 107 based, at least in part, on the social networking information.

Next, the access control manager 203 interacts with the access information collector 207 to receive or otherwise record access history information from the sharing proxy client 107. As noted previously, the access history can be generated by the proxy platform 107 based, at least in part, on the communication endpoints or resources requested by the sharing proxy client 107 via the proxy platform 101. In some embodiments, the access information collector 207 can also determine access information from, for instance, the proxy clients 107 served by the proxy platform 101. This access information can then be used to determined one or more access policies with respect to the access history of the sharing proxy client 107.

As previously described, access information includes information that indicates what communication endpoints and/or resources are accessed by the proxy clients 107. In one embodiment, the access information may include context information to indicate, for instance, when, where, how, etc. the communication endpoints or resources were accessed. In some embodiment, the access information also provides, at least in part, indications of whether access to one or more elements of the access history (e.g., communications endpoints or resources) was granted, denied, or otherwise restricted to one or more of the accessing proxy clients 107. For example, access information may include flags indicating whether a particular communication endpoint, resource (e.g., a website, a phone number, a test messaging number, etc.), or proxy client 107 is associated with objectionable material, malicious content, fraudulent content, and/or other potential risks. In addition or alternatively, access information may include experience that indicates one or more communication endpoints, resources, or proxy clients 107 are free or substantially free from known threats.

For example, based on the collected access information, the access information collector 207 can determine access recommendations such as whether a particular communication endpoint, resource, or proxy client 107 is malicious or objectionable and then determine an appropriate access policy to apply when caching or otherwise access in the communication endpoint or resource. For example, if a communication endpoint meets certain criteria (e.g., reported as objectionable or malicious by a predetermined number of users, reported as free from threats by more than a predetermined number of users, demonstrated to have caused harm to a proxy client 107 or UE 105, etc.), then a corresponding access policy is applied (e.g., deny access to portions of the access history, deny access to caching content from the endpoint, etc.).

In one embodiment, the access information collector 207 can generate access lists (e.g., blacklists to deny access, whitelists to enable access, gray lists to warn before determining access) with respect to the communication endpoints or the participating proxy clients 107. For example, the access information collector 207 may create or compile a blacklist of endpoints or proxy clients 107 that pose a threat level above a threshold value. Entry in the blacklist of a communication endpoint can result in denial of access to that endpoint or by that proxy client 107. Similarly, the access information collector 207 can generate whitelists of endpoints that have been reported to pose no threat or a threat level below a threshold level. Entry in the whitelist of a communication endpoint can, for instance, enable access to access history or information from the proxy client 107 for caching determinations. In another embodiment, the access information collector 207 can generate gray lists to cover proxy clients 107 or communication endpoints that may have at least some of level of potential threat. Entry in the gray list of a proxy client 107 can, for instance, result in presentation notification of potential threats to enable the user to make a decision about whether to permit participation of the listed proxy client 107 in the content discovery and delivery process.

In another embodiment, the access information collector 207 can retrieve or otherwise obtain premade access lists or policies from a third party source (e.g., the services 111, the content providers 113, the service platform 109, etc.). As previously noted, the third party lists or policies may be used when access information is incomplete or unavailable. For example, the third party access lists or policies can apply to communication endpoints, resources, or proxy clients 107 for which there is insufficient threat or risk information.

In one embodiment, the access information collector 207 can determine different policies and/or lists for different accessing proxy clients 107. In this way, the monitoring clients 107 can specify individual access policies for each of the accessing clients 107. In some embodiments, the sharing proxy client 107 can also specify access policies or lists that apply to all or substantially all accessing proxy clients 107. It is contemplated, that the proxy platform 101 can support both common and individualized policies/lists or a combination thereof.

Next, the access information collector 207 can interact with the caching manager 209 to evaluate the access information and related access policies to identify content for retrieval and transmission to the client proxy 107 for caching. More specifically, the caching manager 209 can analyze the access information from one or more proxy clients 107 and then recommend what content from which communication endpoints or websites to cache. In one embodiment, caching manager 209 can make the recommendations based, at least in part, on context information associated with the access information, access history, and/or the proxy clients 107. The caching manager 209 can also recommend a time, frequency, manner, etc. for performing the caching. In yet another embodiment, the caching manager 209 can monitor previously cached content for one or more updates and the initiate a caching of the updated information at the proxy client 107.

On determining one or more recommendations for caching, the caching manager 209 can interact with the notification module 211 to present notifications of the caching to the proxy client 107. It is contemplated that other notifications (e.g., update notifications, status notifications, etc.) can also be facilitated by the notification module 211. In one embodiment, the notification module 211 can generate and cause transmission of the notifications directly to the proxy client 107. In addition or alternatively, the notification module 211 can interface with the notification service 115 to facilitate transmission and/or delivery of the notifications to the proxy client 107.

Figure 3:
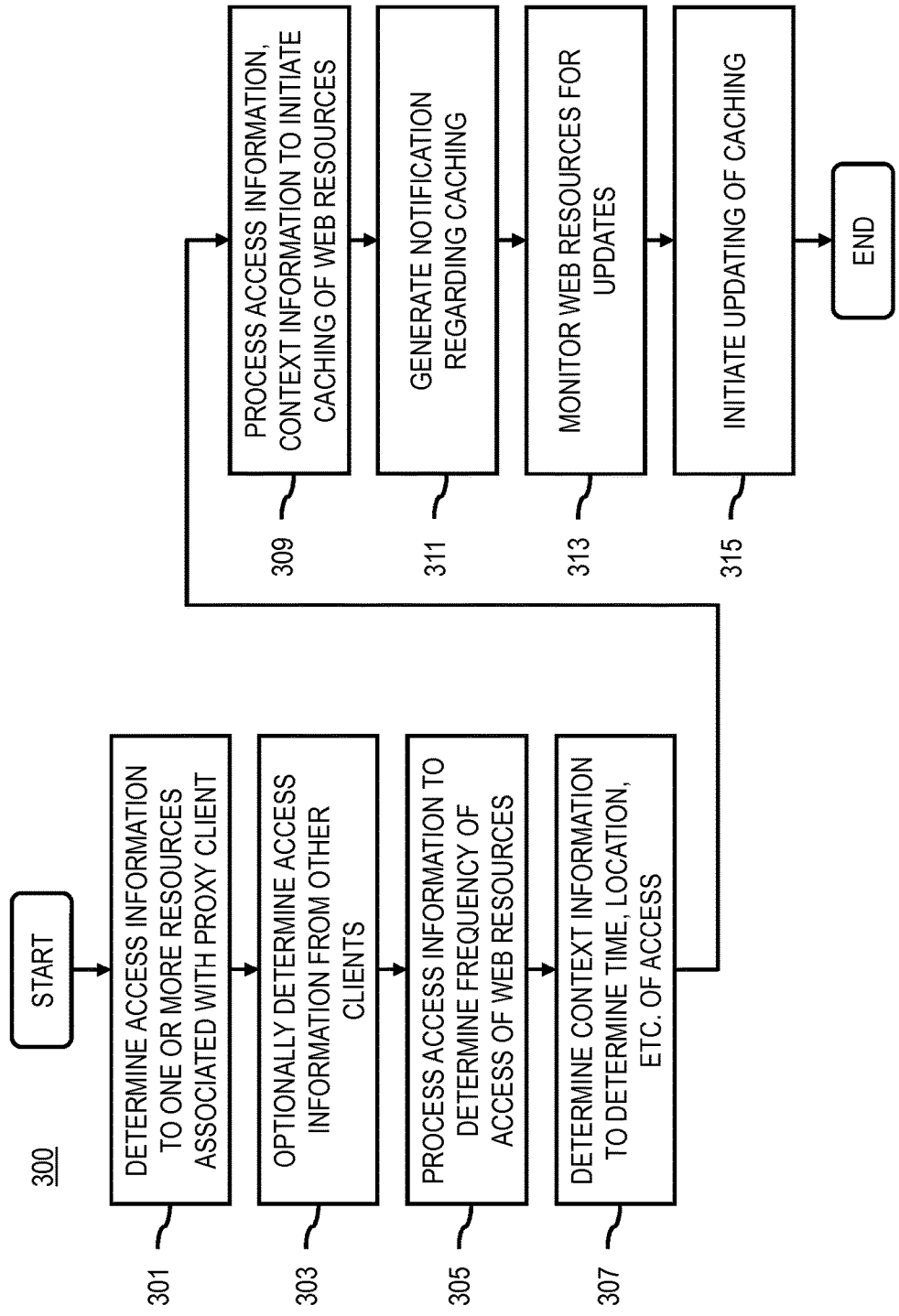
FIG. 3 is a flowchart of a process for providing proxy-based content discovery and delivery, according to one embodiment.

FIG. 3 is a flowchart of a process for providing proxy-based content discovery and delivery, according to one embodiment. In one embodiment, the proxy platform 101 performs the process 300 and is implemented in, for instance, a chip set including a processor and a memory as shown FIG. 6. In step 301, the proxy platform 101 determines access information with respect to one or more web resources. In one embodiment, the access information associated with a proxy client 107 of the proxy platform 101. The proxy platform 101 can also optionally determine other access information associated with one or more other proxy clients 107 of the proxy platform 101 (step 303). As noted above, the one or more proxy clients 107 can be selected based, at least in part, on social networking relationships among the proxy clients 107. In one embodiment, the one or more other proxy clients 107 may be selected based, at least in part, on other criteria (e.g., similarity, proximity, etc. to the initial proxy client 107).

In step 305, the proxy platform 101 processes and/or facilitates a processing of the access information (e.g., from the initial proxy client 107 and/or the one or more other proxy clients 107) to determine a frequency of access of the one or more web resources via the proxy platform 101. For example, if the determined frequency indicates that one or more of the proxy clients 107 have visited a particular communication endpoint more than a predetermined number of times, the proxy platform 101 can recommend the endpoint for caching or can immediately retrieve at least part of the content from the communication endpoint to transmit (e.g., push) to the proxy client 107 for caching. In addition or alternatively, it is contemplated that the proxy platform 101 may use criteria other than frequency to determine or recommend caching. For example, the proxy platform can also recommend similar or related sites to the most frequently visited sites or endpoints. In another example, the proxy platform 101 can perform a semantic analysis of the access information or access history to determine keywords or topics that might describe areas of user interest. The proxy platform 101 can then recommend sites or endpoints for caching based, at least in part, keywords and/or topics.

In some embodiments, the proxy platform 101 also determines context information associated with the access history, access information, the proxy client 107, the communication endpoints, etc. as part of the caching or recommendation process (step 307). The proxy platform 101 can make the determination to initiate the caching of the at least a portion of the one or more web resources is based, at least in part, on the context information. In other words, the proxy platform 101 processes and/or facilitates a processing of the context information to determine at least one location, at least one time, or a combination thereof to cache the at least a portion of the one or more web resources.

For example, if the context information indicates that a user frequently accesses a web resource (e.g., a news website) on most weekdays at approximately 8:00 am, the proxy platform 101 can retrieve the content from the web resource to push to the proxy client 107 at approximately 8:00 am on weekdays. Similarly, if the context information that when the a user enters a particular location (e.g., a shopping mall, home, etc.), the user frequently accesses a particular website (e.g., a coupon website), the proxy platform 101 can determine location information associated with the corresponding proxy client 107 and initiate caching of the particular website when the user enters the location. It is contemplated that the proxy platform 101 can base its caching determination on any context that can be detected or inferred at the proxy client 107 (e.g., activity context, weather context, environmental context, etc.). In addition or alternatively, the proxy platform 101 can also receive a manual input (e.g., from the proxy client 107) for specifying a time to update the caching, a frequency of updating the caching, a location for updating the caching, or a combination thereof.

In step 309, the proxy platform 101 processes and/or facilitates a processing of the access information, the context information, and/or related information to determine to initiate a caching of at least a portion of the one or more web resources at the proxy client 107. In one embodiment, the processing and/or determination is based, at least in part, on the frequency of access determined in step 305 above. On making the determination to initiate or recommend caching, the proxy platform 101 determines to generate at least one notification message of the caching, one or more updates to the caching, the one or more web resources, or a combination thereof (step 311). The proxy platform 101 then causes, at least in part, transmission of the at least one notification message to the proxy client 107.

In step 313, the proxy platform 101 causes, at least in part, monitoring of the one or more web resources for one or more updates. The proxy platform then processes and/or facilitates a processing of the one or more updates to initiate an updating of the caching of the at least a portion of the one or more web resources (step 315). In one embodiment, steps 313 and 315 are optional; the proxy platform 101 can instead initiate updating of the cached according to a timed interval, schedule, predetermined frequency, etc.

Figure 4B:
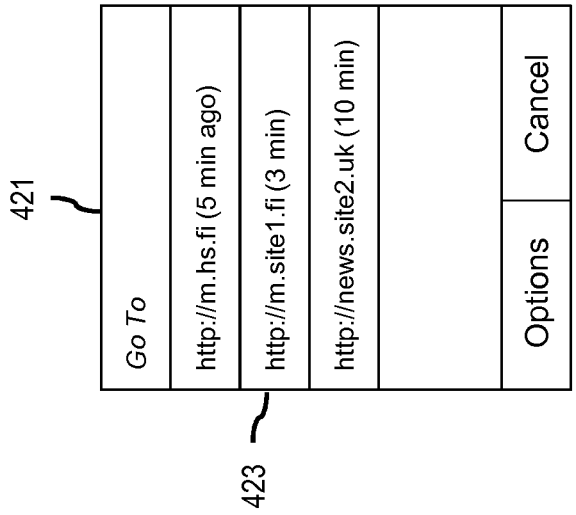
FIGS. 4A-4D are diagrams of user interfaces utilized in the processes of FIGS. 1-3, according to various embodiments.
Figure 4A:
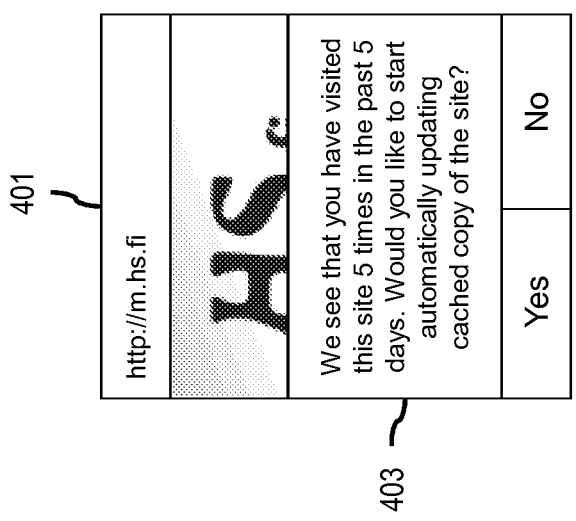
Figure 4D:
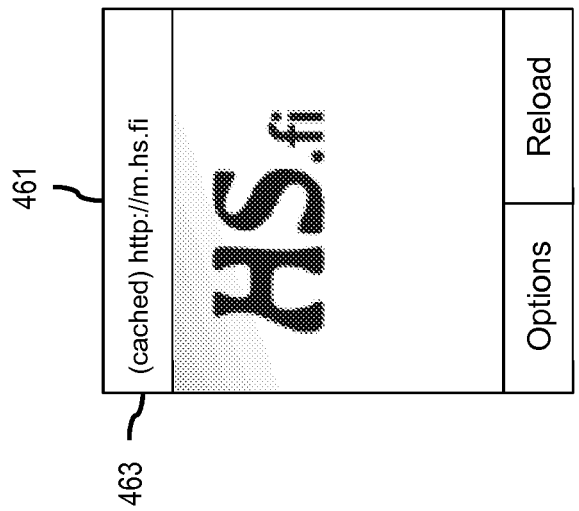

FIGS. 4A-4D are diagrams of user interfaces utilized in the processes of FIGS. 1-4, according to various embodiments. FIG. 4A depicts an example where the proxy platform 101 has detected that a user of a proxy client 107 has visited a website, "http://m.hs.fi", frequently based on the proxy client 107's access history. In response, the proxy platform 101 presents a user interface (UI) 401 that display a prompt 403 that asks the user if the user wants the site to be automatically pushed to the user's proxy client 107 or UE 105 for caching. In one embodiment, the proxy platform 101 can additionally request whether the user would like to specify a time, schedule, or frequency for pushing the website's content from the proxy platform 101 to the proxy client 107 for caching.

After caching one or more websites or communication endpoints, the corresponding proxy client 107 can display a UI 421 of FIG. 4B that presents a list 423 of previously cached sites. In this case, three sites have been previously cached at the proxy client 107 by the proxy platform 101. The list 423 also includes a time of the last update of the cache for each site.

Figure 4C:
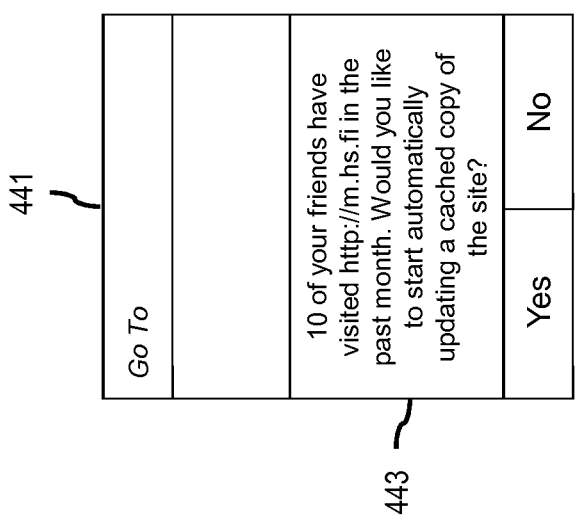

FIG. 4C depicts an example where the proxy platform 101 has detected that a user's friends have visited a site, "http://m.hs.fi", frequently. In response, the proxy platform 101 displays a UI 441 presenting a message 443 that notifies that user that "10 of your friends have visited http://m.hs.fi in the past month." In this example, because the user has already cached the site, the proxy platform 101 further includes in the message 443 a query asking the user whether the user would like to start automatically updating the previously cached copy of the site.

When the user browses to the site, "http://m.hs.fi", the proxy platform 101 and/or the proxy client 107 itself determines that the site has already been cached. As a result, the proxy client 107 retrieves the cached copy of the site and displays it in the UI 461. In one embodiment, the proxy platform 101 can provide an indicator 463 that the user is currently viewing the cached version of the site. In this way, the proxy client 107 need not go online to fetch the site since the proxy client 107 already has a locally cached copy which was fetched earlier. The user can then freely browse the page without have to go online, thereby reducing loading times as well as potentially reducing resources associated with fetching the content on demand.

The processes described herein for providing proxy-based content discovery and delivery may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 5:
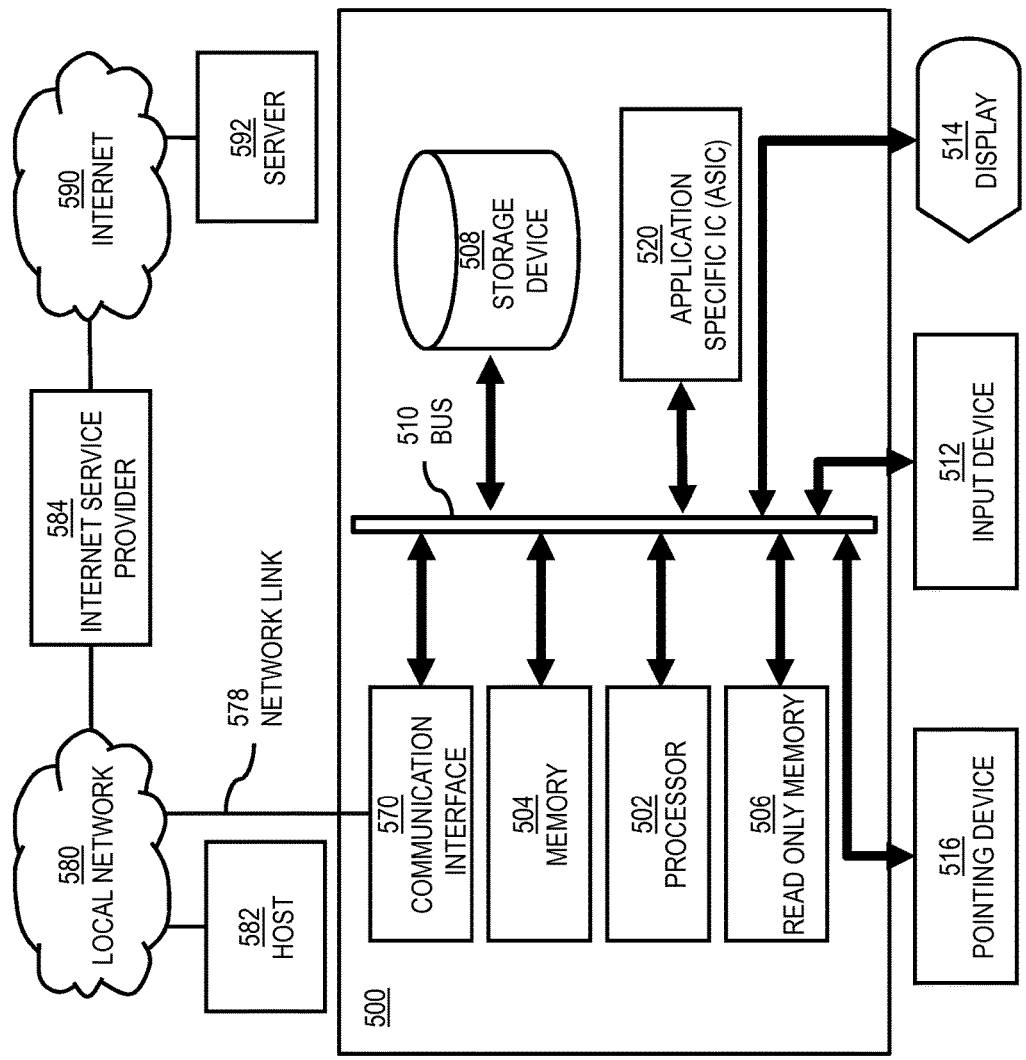
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to provide proxy-based content discovery and delivery as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of providing proxy-based content discovery and delivery.

A bus 510 includes one or more parallel conductors of information so that information is transferred quickly among devices coupled to the bus 510. One or more processors 502 for processing information are coupled with the bus 510.

A processor (or multiple processors) 502 performs a set of operations on information as specified by computer program code related to providing proxy-based content discovery and delivery. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or any other dynamic storage device, stores information including processor instructions for providing proxy-based content discovery and delivery. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or any other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for providing proxy-based content discovery and delivery, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT), a liquid crystal display (LCD), a light emitting diode (LED) display, an organic LED (OLED) display, a plasma screen, or a printer for presenting text or images, and a pointing device 516, such as a mouse, a trackball, cursor direction keys, or a motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of ASICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 103 for providing proxy-based content discovery and delivery.

The term "computer-readable medium" as used herein refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or any other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
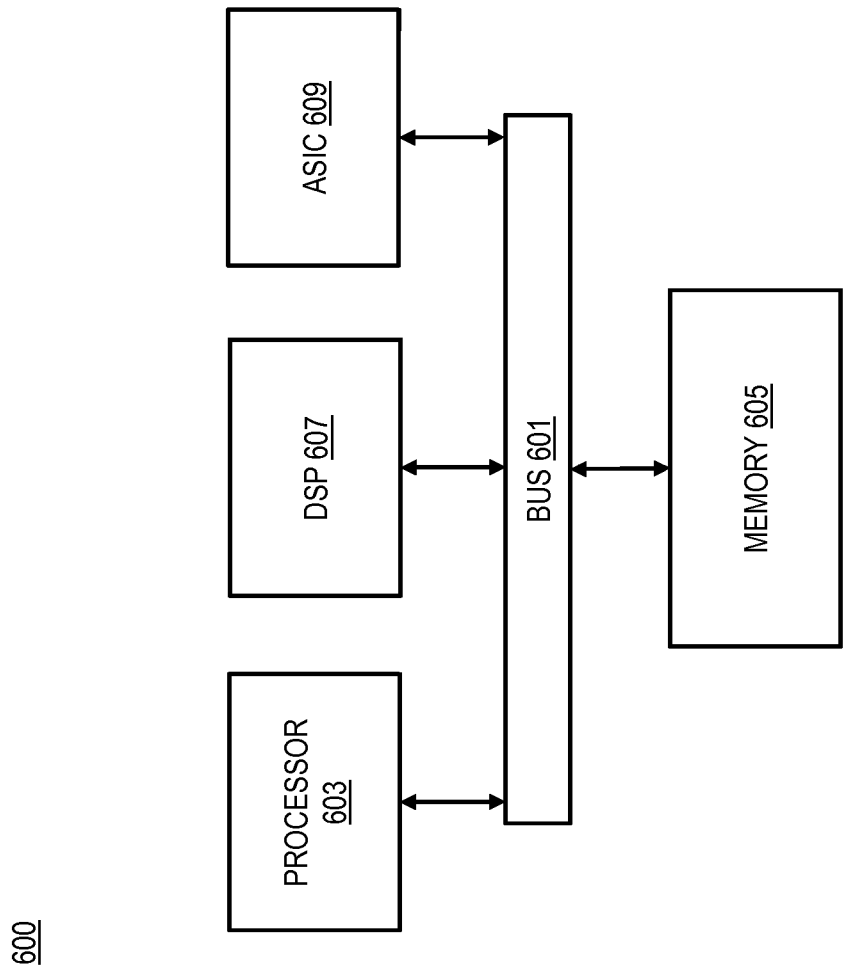
FIG. 6 is a diagram of a chip set that can be used to implement an embodiment of the invention.

FIG. 6 illustrates a chip set or chip 600 upon which an embodiment of the invention may be implemented. Chip set 600 is programmed to provide proxy-based content discovery and delivery as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 600 can be implemented in a single chip. It is further contemplated that in certain embodiments the chip set or chip 600 can be implemented as a single "system on a chip." It is further contemplated that in certain embodiments a separate ASIC would not be used, for example, and that all relevant functions as disclosed herein would be performed by a processor or processors. Chip set or chip 600, or a portion thereof, constitutes a means for performing one or more steps of providing user interface navigation information associated with the availability of functions. Chip set or chip 600, or a portion thereof, constitutes a means for performing one or more steps of providing proxy-based content discovery and delivery.

In one embodiment, the chip set or chip 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 600 includes merely one or more processors and some software and/or firmware supporting and/or relating to and/or for the one or more processors.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to provide proxy-based content discovery and delivery. The memory 605 also stores the data associated with or generated by the execution of the inventive steps.

Figure 7:
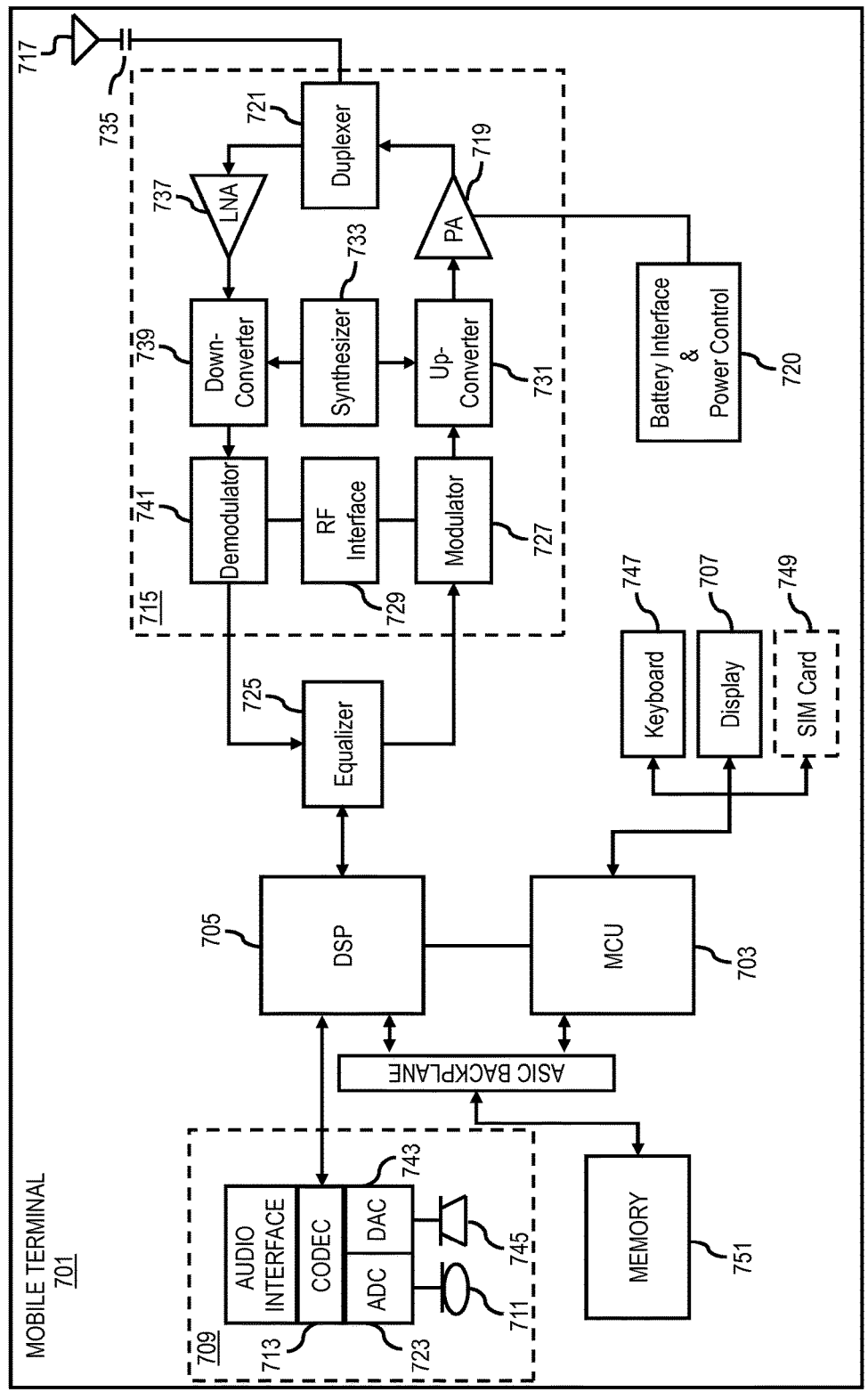
FIG. 7 is a diagram of a mobile station (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 701, or a portion thereof, constitutes a means for performing one or more steps of providing proxy-based content discovery and delivery. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1)

hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of providing proxy-based content discovery and delivery. The display 707 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703 which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to provide proxy-based content discovery and delivery. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, by a processor of a proxy server, access information with respect to one or more requests associated with one or more resource servers for accessing one or more web resources by a client of the proxy server;
   processing, by the processor, the access information to determine a frequency of access of the one or more web resources via the proxy server by the client residing on a user device;
   initiating, by the processor, a transmission of the one or more requests to the one or more resource servers;
   determining, by the processor, that the user device is at a geographic location and accesses at least one webpage of the one or more web resources at a predetermined frequency;
   in response to the determination, initiating a caching of the at least one webpage of the one or more web resources at the client residing on the user device based, at least in part, on the frequency of access, wherein the at least one webpage of the one or more web resources includes content other than web resource identifiers and addresses;
   initiating, by the processor, an update of the content associated with the caching at the client, when the user device subsequently arrives at the geographic location;
   determining context information associated with the access information, the client residing on the user device, or a combination thereof;
   processing the context information to determine at least one location and at least one weather context to cache the at least webpage of the one or more web resources, the weather context comprising at least one weather occurrence;
   initiating another update of the content associated with the caching at the client at a subsequent occurrence of the at least one weather occurrence of the at least one weather context at the at least one location;
   initiating a display of the at least one webpage with the content after the another update at the user device, when the user device browses a website including the at least one webpage at the at least one location; and
   initiating a semantic analysis of the access information to determine one or more keywords, one or more topics, or a combination thereof for recommending one or more other web resources for caching.

2. The method of claim 1, further comprising:
   determining other access information associated with one or more other clients of the proxy server;
   processing the other access information to determine one or more other frequencies of access of the one or more web resources via the proxy server by the one or more other clients residing on one or more other user devices;
   determining at least one recommendation of a caching of at least a portion of the one or more web resources at the client residing on the user device based, at least in part, on the one or more other frequencies of access, wherein the at least a portion of the one or more web resources recommended for caching includes content of one or more web pages, one or more web sites, or a combination thereof, other than web resource identifiers and addresses; and
   initiating a display of the at least one recommendation and at least one webpage at the user device.

3. The method of claim 2, further comprising:
   determining social networking information associated with one or more users of the user device;
   processing the social networking information to select the one or more other clients residing on the one or more other user devices;
   processing access information to the one or more web resources by the one or more other clients, to determine one or more frequencies of access of the one or more web resources via the proxy server by the one or more other clients;
   initiating a display of the one or more frequencies of access together with the at least one recommendation, wherein the recommendation is further based, at least in part, on the social networking information and the one or more frequencies of access.

4. The method of claim 1, further comprising:
   initiating a display of the at least one webpage with the updated content at the user device, when the user device uses a web browser at the geographic location;
   wherein the caching of the at least one webpage of the one or more web resources is initiated based, at least in part, on the context information.

5. The method of claim 1, further comprising:
   monitoring one or more access time points, one or more access time periods, or a combination thereof, for frequent access time points related to the one or more web resources, wherein the caching is initiated at one of the frequent access time points; and
   updating the content associated with the caching at a subsequent one of the frequent access time points.

6. The method of claim 1, further comprising:
   generating at least one notification message of the caching, one or more updates to the caching, the one or more web resources, or a combination thereof; and
   initiating a transmission of the at least one notification message to the client.

7. The method of claim 6, further comprising:
   including at least one webpage of the caching, the one or more updates to the caching, or a combination thereof, in the at least one notification message; and
   initiating a display of the at least one webpage of the caching, the one or more updates to the caching, or a combination thereof, at the user device.

8. The method of claim 1, wherein the caching is performed as a push operation from the proxy server.

9. An apparatus comprising:
   at least one processor; and
   at least one memory including computer program code for one or more programs, the at least one memory and the computer program code configured to, with the at least one processor, cause the apparatus embedded in a proxy server to perform at least the following, determine access information with respect to one or more requests associated with one or more resource servers for accessing one or more web resources by a client of the proxy server;

process the access information to determine a frequency of access of the one or more web resources via the proxy server by the client residing on a user device;

initiate a transmission of the one or more requests to the one or more resource servers;

determine that the user device is at a geographic location and accesses at least one webpage of the one or more web resources at a predetermined frequency;

in response to the determination, initiate a caching of at least one webpage of the one or more web resources at the client residing on the user device based, at least in part, on the frequency of access, wherein the at least one webpage of the one or more web resources includes content other than web resource identifiers and addresses;

initiate an update of the content associated with the caching at the client, when the user device subsequently arrives at the geographic location;

determine context information associated with the access information, the client, or a combination thereof;

process the context information to determine at least one location, at least one time, or a combination thereof to cache the at least one webpage of the one or more web resources; and process the context information to determine at least one weather context to cache the at least webpage of the one or more web resources, the weather context comprising at least one weather occurrence; and initiate an update of the content at a subsequent occurrence of the at least one weather occurrence of the at least one weather context at the at least one location.

10. The apparatus of claim 9, wherein the apparatus is further caused to:

determine other access information associated with one or more other clients of the proxy server, wherein the frequency of access is determined further based, at least in part, on the other access information.

11. The apparatus of claim 10, wherein the apparatus is further caused to:

determine social networking information associated with the client, one or more users of the client, or a combination thereof; and process the social networking information to select the one or more other clients.

12. The apparatus of claim 9, wherein the determination to initiate the caching of the at least one webpage of the one or more web resources is based, at least in part, on the context information.

13. The apparatus of claim 9, wherein the apparatus is further caused to:

receive an input for specifying a time to update the caching, a frequency of updating the caching, a location for updating the caching, or a combination thereof.

14. The apparatus of claim 9, wherein the apparatus is further caused to:

monitor the one or more web resources for one or more updates; and process the one or more updates to initiate an updating of the caching of the at least one webpage of the one or more web resources.

15. The apparatus of claim 9, wherein the apparatus is further caused to:

generate at least one notification message of the caching, one or more updates to the caching, the one or more web resources, or a combination thereof; and initiate a transmission of the at least one notification message to the client.

16. The apparatus of claim 9, wherein the apparatus is further caused to:

include at least one webpage of the caching in the at least one notification message.

17. The apparatus of claim 9, wherein the caching is performed as a push operation from the proxy server.

* * * * *